May 18, 1926.
R. W. McCASLAND
MATERIAL HANDLING APPARATUS
Filed June 2, 1925
1,585,399
7 Sheets-Sheet 1
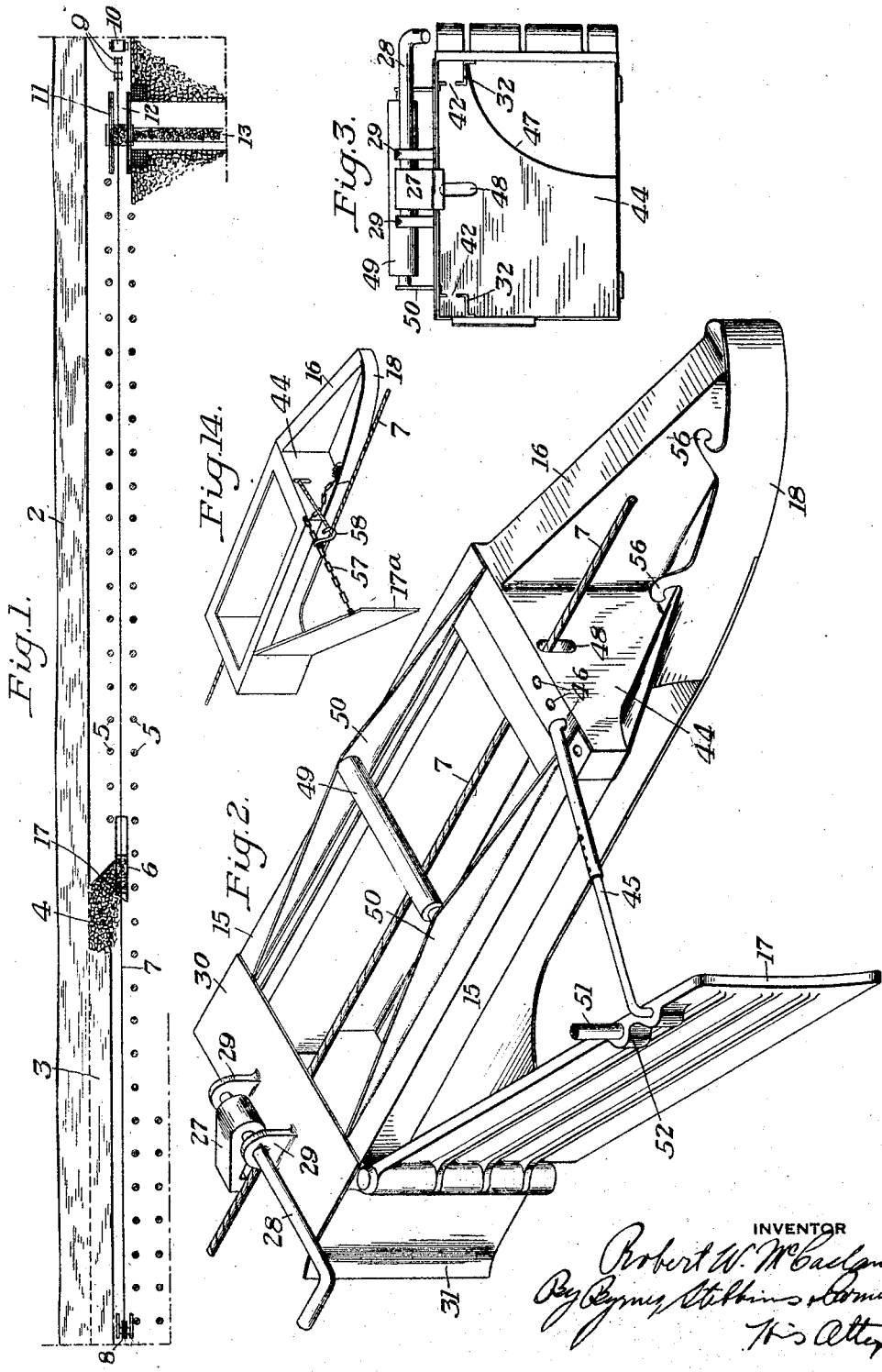
INVENTOR

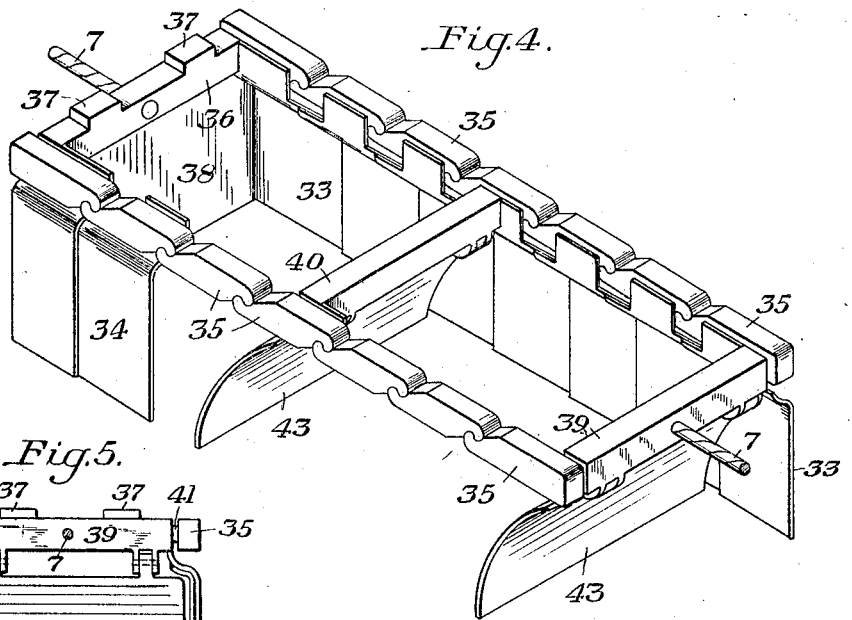
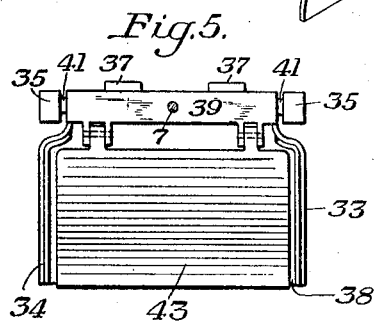
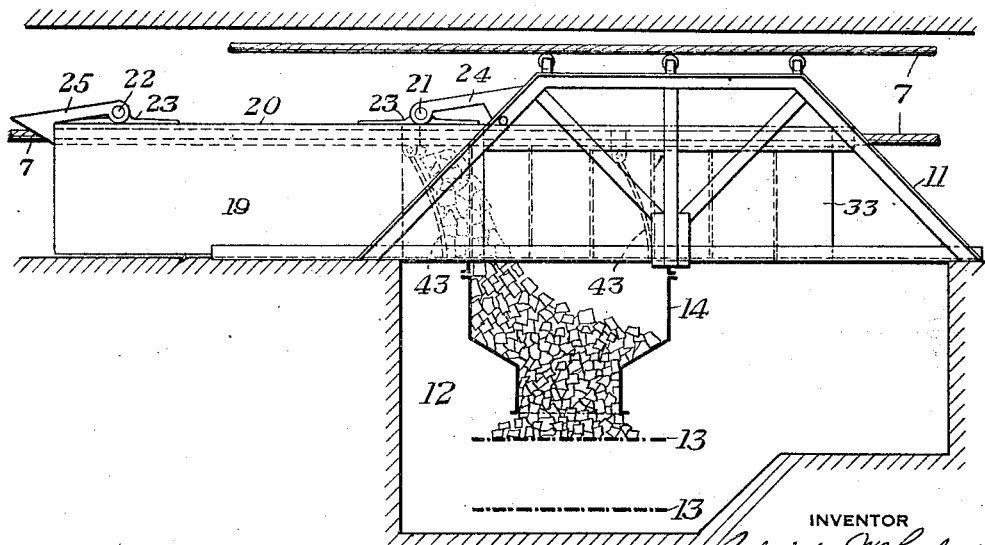

May 18, 1926.
R. W. McCASLAND
MATERIAL HANDLING APPARATUS
Filed June 2, 1925
1,585,399
7 Sheets-Sheet 3
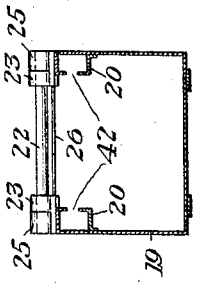
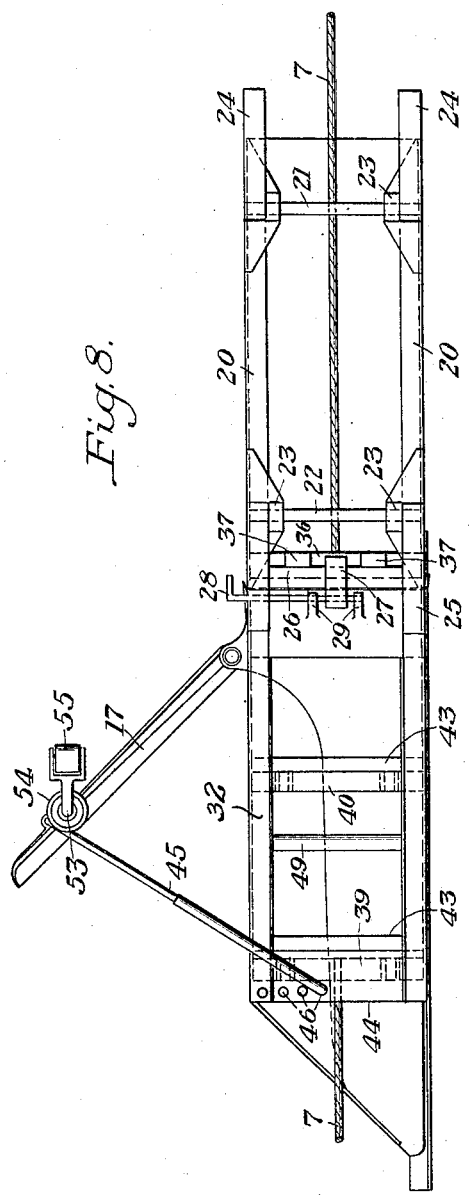
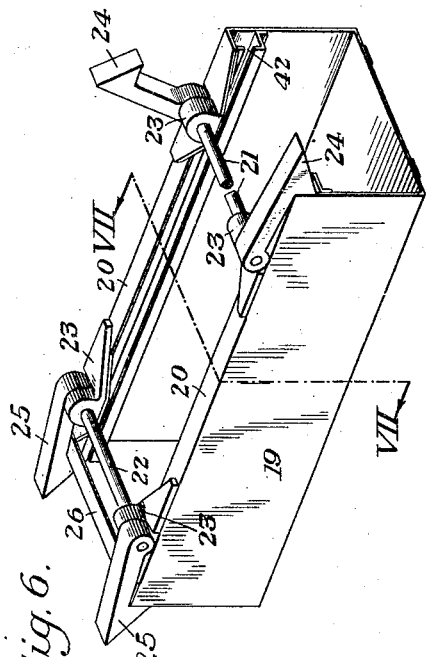
INVENTOR
Robert W. McCasland
By Byrnes Stebbins, Parmelee
His Attys May 18, 1926.
R. W. McCASLAND
MATERIAL HANDLING APPARATUS
Filed June 2, 1925
1,585,399
7 Sheets-Sheet 4
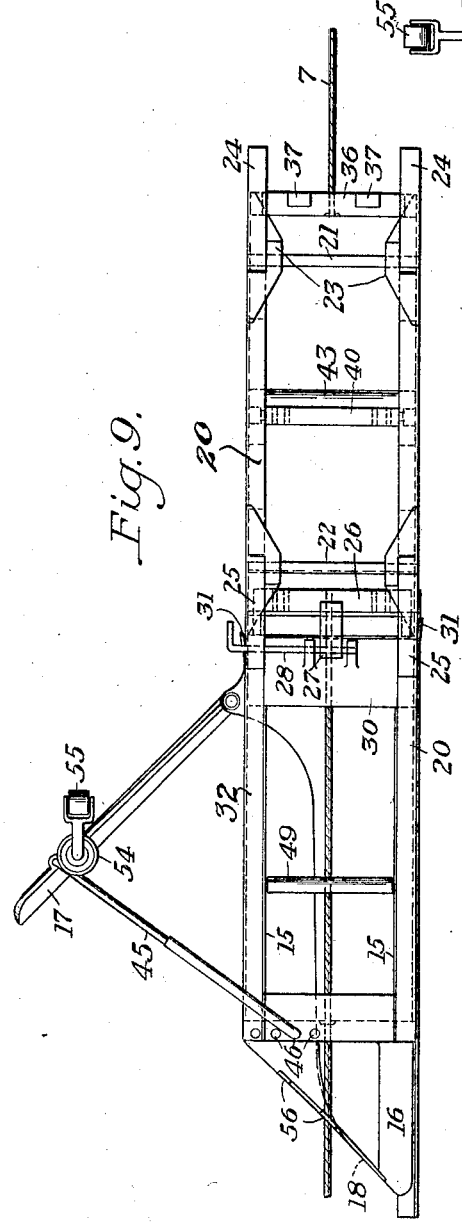
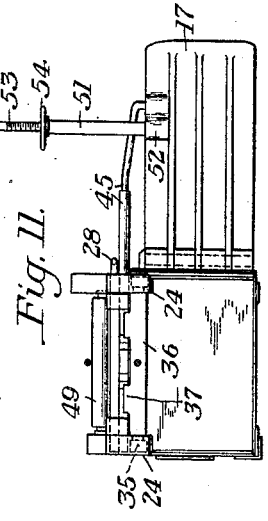
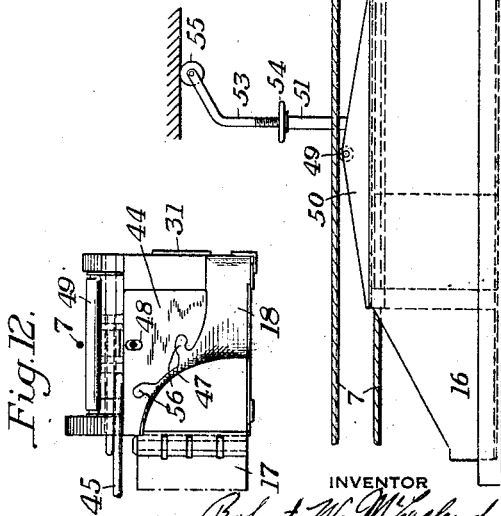
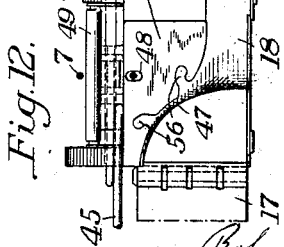
INVENTOR

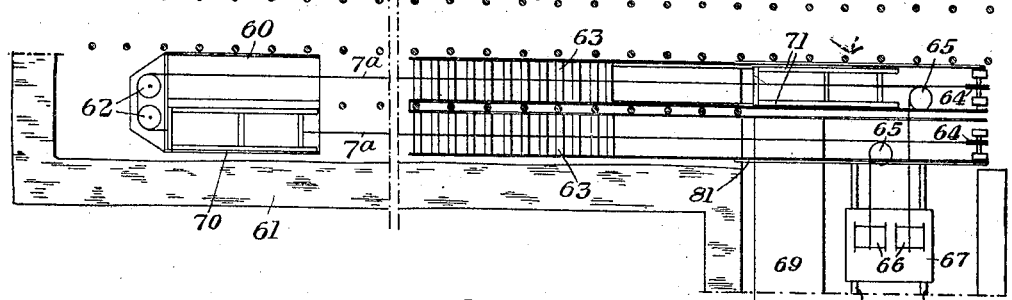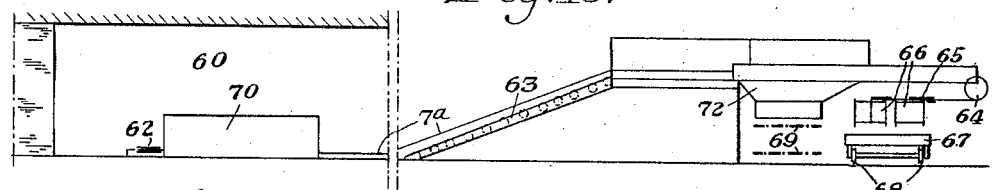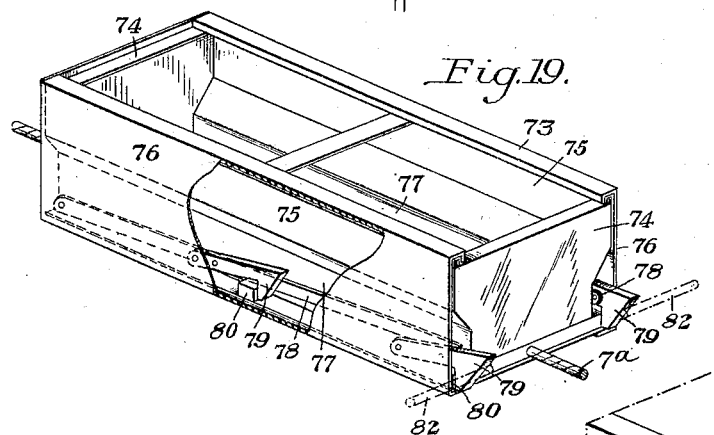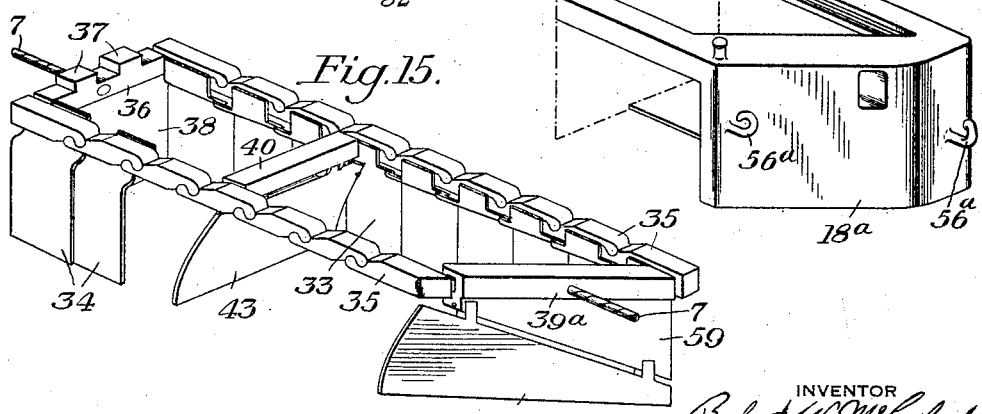

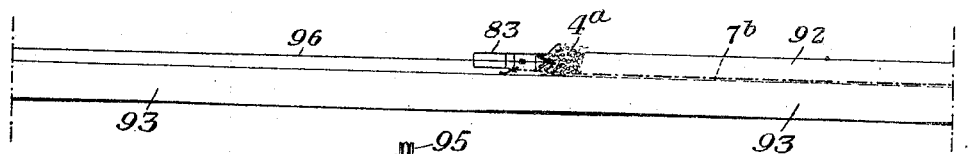
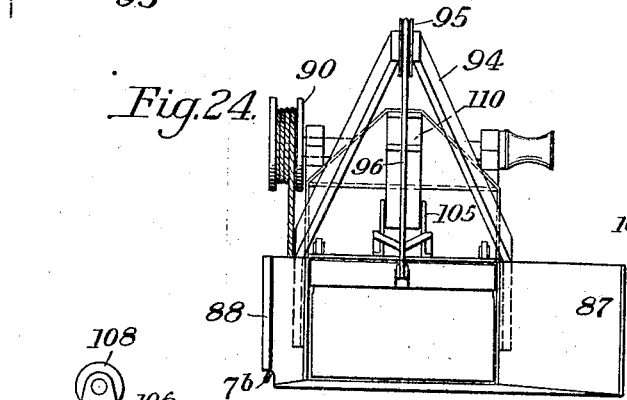
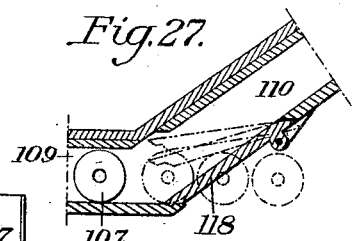
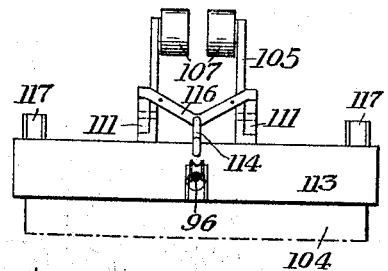
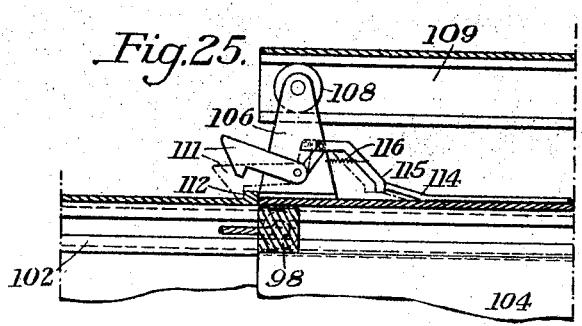
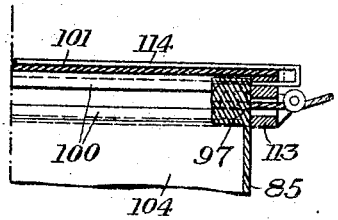
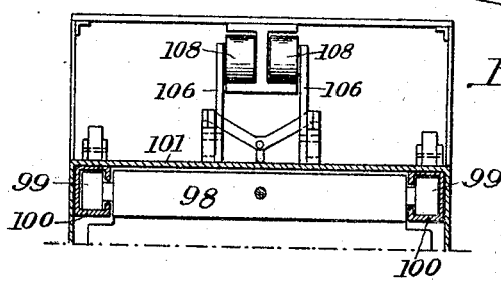

May 18, 1926.  
R. W. McCASLAND  
MATERIAL HANDLING APPARATUS  
Filed June 2, 1925  
1,585,399  
7 Sheets-Sheet 7

INVENTOR  
Robert W. McCasland  
By Byrnes, Stebbins & Parmelee  
His Attys

Patented May 18, 1926.

1,585,399

UNITED STATES PATENT OFFICE.

ROBERT W. McCASLAND, OF CRAFTON, PENNSYLVANIA.

MATERIAL-HANDLING APPARATUS.

Application filed June 2, 1925. Serial No. 34,392.

The present invention relates to material handling apparatus, and more particularly to apparatus for use in long wall mining for transferring loose coal which has been undercut and broken down from the wall of the coal vein to a suitable conveyor or car system for carrying the coal out of the mine.

The invention is illustrated in the accompanying drawings, wherein:—

Figure 1 is a more or less diagrammatic view, showing the application of a preferred embodiment of the invention to thin vein mining;

Figure 2 is a perspective view of the charging box forming one of the units of the transfer means;

Figure 3 is a rear end elevation of the charging with the deflector removed;

Figure 4 is a perspective view of the transfer drag;

Figure 5 is a front end elevation of the transfer drag;

Figure 6 is a perspective view of the transfer box;

Figure 7 is a transverse section of the transfer box taken on the line VII—VII of Figure 6;

Figure 8 is a plan view, showing the position of the parts when the transfer drag has been pulled into position in the charging box;

Figure 9 is a view corresponding to Figure 8, but showing the transfer drag pulled back into the transfer box;

Figures 10, 11 and 12 are, respectively, a side elevation, a rear end elevation and a front end elevation of the construction shown in Figure 9;

Figure 13 is a view showing the transfer box and transfer drag at the discharge station discharging the coal onto a conveyor;

Figure 14 is a perspective view of a slightly modified form of charging box;

Figure 15 is a perspective view of a modified form of transfer drag;

Figure 16 is a broken view of a modified form of charging box for cooperation with the modified form of transfer drag shown in Figure 15;

Figure 17 is a more or less diagrammatic view, showing the application of another embodiment of my invention to thick vein mining;

Figure 18 is a view similar to Figure 17, but showing the apparatus diagrammatically in side elevation;

Figure 19 is a perspective view of the transfer means employed in the construction shown in Figures 17 and 18;

Figure 20 is a diagrammatic plan view of another embodiment of my invention adapted for thick vein mining;

Figure 24 is a front end elevation of the transfer means shown in Figure 21;

Figures 25, 26 and 27 are detail sectional views of the construction shown in Figure 21;

Figure 28 is a section on the line XXVIII—XXVIII of Figure 21; and

Figure 29 is a front end elevation of the movable guide frame employed in the construction shown in Figure 21.

Figure 21:
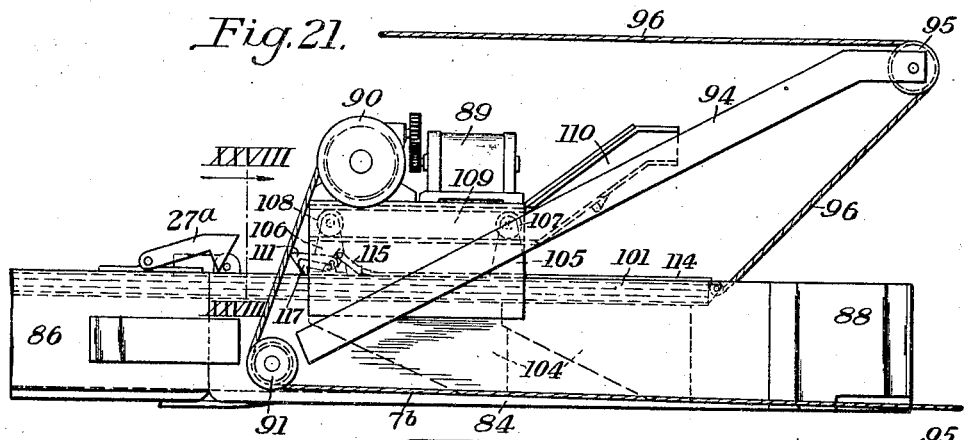
Figures 21 and 22 are, respectively, a side elevation and a plan view, partly broken away, of the transfer means employed in the system shown in Figure 20.

The construction shown in Figures 1 to 16, inclusive, is particularly adapted to thin vein coal mining where there is a relatively small amount of head room. Referring to Figure 1, 2 designates the coal vein, 3 an undercut portion thereof, and 4 a mass of loose coal which has been broken down from the undercut portion. In front of the coal wall are shown the usual rows of posts 5 which support the roof of the mine. The apparatus for transferring the loose coal from the undercut wall to the conveyor system is adapted to operate between two such rows of posts. The transfer means 6 is shown in operative position at the coal pile 4. Extending from this transfer means is the operating cable 7 which passes around a head sheave 8 placed at a suitable point along the undercut wall and adapted to be advanced along said wall as the breaking down and transferring of the coal progresses. The operating cable also extends to suitable winding drums 9 operated by a motor 10. The winding drums 9 and motor 10 are arranged adjacent a bridge 11 which spans a recess 12 in the floor of the mine. This recess may accommodate any suitable conveyor system for taking the coal out of the mine. In Figures 1 and 13, a belt conveyor 13 is shown for this purpose. The transfer means is adapted to transfer a load of coal from the pile 4 to the bridge 11 and to discharge the same into a chute 14 beneath the bridge which directs the coal onto the conveyor.

The transfer means comprises a charging box, a preferred embodiment of which is shown in Figures 2 and 3. This charging box is in the form of a rectangular frame 15 having a plow 16 at its forward end for plowing into the loose coal at the edge of the coal pile and deflecting the coal towards a deflector 17 which is pivoted at its rear end to one side of the charging box. The side of the box to which the deflector 17 is pivoted is open from the pivoted end of the deflector to the curved wall 18 of the plow. The deflector operates against the coal as the charging box is pulled forward by the operating cable, as illustrated in Figure 1, and deflects the coal through the open side of the charging box into the transfer drag, which will be hereinafter described.

Adapted for cooperation with the charging box is a transfer box 10, shown in Figures 6 and 7. This transfer box is open at its ends and top. It has guides 20 extending longitudinally thereof at the upper edges of its sides. Adjacent the front and rear ends of the box are transverse shafts 21 and 22 supported in bearings 23 mounted on top of the guides 20. Journaled on the ends of these shafts are pairs of dogs 24 and 25. At the forward end of the transfer box there is a transversely extending bar 26 connecting the sides of the box at their upper edges. When the forward end of the transfer box is in abutting relation with the rear end of the charging box, as illustrated in Figures 8, 9 and 10, the transfer box is adapted to be held connected to the charging box by a dog 27 carried by an operating rod 28 journaled in ears 29 integral with a transverse plate 30 connecting the sides of the charging box. In order to guide the transfer box into cooperative abutting relation with the charging box, the latter is provided at its rear end with rearwardly extending outwardly curved plates 31. The charging box is also provided with guides 32 corresponding to the guides 20 of the transfer box.

Adapted for cooperation with the transfer box and charging box is a transfer drag, shown in Figures 4 and 5. This transfer drag comprises side walls 33 and 34 formed of plates which overlap at their edges. The side wall 34 has an opening therein corresponding to the opening in the side of the charging box, whereby when the transfer drag is pulled into the charging box, the deflector 17 will deflect the coal into the transfer drag through the open side thereof and the open side of the charging box. At the upper longitudinal edges of the sides of the transfer drag are bars 35 which, as shown, may be formed of interconnected links to render the bars flexible. These bars are adapted to slide in the guides 20 and 32 of the transfer box and charging box. Connecting the bars 35 at the rear end of the box is a transverse bar 36 having lugs 37 extending upwardly from its upper edge. This bar has depending therefrom a plate 38 forming the rear end wall of the transfer drag. Connecting the bars 35 at their forward ends and at one or more intermediate points are transverse bars 39 and 40. The bars 36, 39 and 40 are connected to the bars 35 by reduced portions 41 adapted to slide through the openings 42 at the inner sides of the guides 20 and 32. Pivoted at their upper edges to the bars 39 and 40 are curved drag plates 43. The ends of the operating cable 7 are connected to the bars 36 and 39 at the ends of the transfer drag.

Figure 8 shows the transfer box in abutting relation with the charging box and locked thereto by the dog 27. This figure also shows the transfer drag pulled forward into the transfer box. It will be noted that in this position of the parts the transverse bar 39 at the forward end of the transfer drag is in engagement with the rear face of the transverse front wall 44 of the charging box and that the lugs 37 of the bar 36 are in engagement with the transverse bar 26 at the forward end of the transfer box. In other words, the movement of the transfer drag into the charging box is limited by the engagement of the bar 39 with the wall 44 and the engagement of the lugs 37 with the transverse bar 26 insures that the transfer box will be pulled up into abutting relation with the charging box and locked thereto by the dog 27 when the transfer drag is pulled into position in the charging box.

When the parts of the transfer means have been pulled into the relative positions shown in Figure 8 by the operating cable 7, further movement of the cable in the same direction will pull the transfer means as a unit forwardly in engagement with the coal pile 4 and thereby cause coal to be deflected by the plow 16 and deflector 17 into the transfer drag and charging box. The forward end portion of the deflector 17 is connected to the front wall 44 of the charging box by a rod 45 formed of two telescopic parts whereby the length of the rod can be adjusted. One end of this rod is adapted to be engaged in any one of the spaced holes 46 formed in the upper edge of the wall 44. The position of the deflector can therefore be adjusted with respect to the open side of the charging box. By reference particularly to Figure 3, it will be seen that the front wall 44 is cut away adjacent the open side of the box on the curved line 47 in order to facilitate the entry of the coal into the box. The lower run of the operating cable 7 passes through an opening 48 in the front wall 44 and beneath an anti-friction roller 49 which extends transversely of the charging box centrally thereof and is journaled in flanges 50 extending upwardly from the sides of the box. The upper run of the cable extends over this anti-friction roller and is adapted to engage the same. The deflector 17 carries a vertically extending hollow post 51, the lower end portion of which is seated in a socket 52 integral with the upper edge portion of the deflector 17. The screw threaded lower end of a rod 53 projects into this hollow post and is engaged by a handwheel 54 mounted on the upper end of the post. This rod is bifurcated at its upper end and has an anti-friction roller 55 journaled therein. This anti-friction roller is adapted to engage the roof of the mine as the transfer means is pulled forward by the cable in order to prevent the charging box from tilting. In pulling the transfer means forwardly in contact with the loose coal, the charging box may have a tendency to swing into the coal pile by reason of the engagement of the deflector 17 with the coal. In order to overcome this, the curved wall 18 of the plow has hooks 56 with which the cable is adapted to be engaged. In the modified form of charging box shown in Figure 14, the hooks are omitted from the curved wall of the plow and the deflector 17$^a$ is connected to the front wall 44 of the charging box by a chain 57. This chain carries a hook 58 with which the cable may be engaged to overcome tendency of the charging box to swing into the coal pile.

In the modified form of charging box 15$^a$ shown in Figure 16, there is no front wall corresponding to the front wall 44 shown in the Figure 2 construction, and the transfer drag, shown in Figure 15, is correspondingly modified to extend into the front end portion of the box 15$^a$. There is a diagonal wall 18$^a$ at the front end of the charging box constituting the plow portion of the box and the transfer drag has a diagonal bar 39$^a$ at its forward end for engagement with the diagonal front wall 18$^a$. The front deflector plate 43$^a$ has an inclined upper edge which is hinged to the inclined lower edge of a plate 59 projecting downwardly from the bar 39$^a$. The front wall 18$^a$ has hooks 56$^a$ associated therewith for engagement with the operating cable, these hooks performing the same function as the hooks in the Figure 2 construction.

After the transfer drag has been pulled into position in the charging box, as illustrated in Figure 8, and the transfer means pulled forwardly to charge the coal into the charging box, the deflector plates 43 swing rearwardly to allow the coal to pass into the charging box behind the transfer plates. These transfer plates are bowed rearwardly and are of such height as to prevent the plates from passing dead center when the pull of the cable 7 is reversed to draw the transfer drag out of the charging box.

When the charging box has been loaded by the forward movement of the transfer means, the pull of the cable 7 is reversed to draw the transfer drag out of the charging box and into the transfer box. The relative positions of the parts when this has been accomplished is shown in Figures 9 and 10, wherein it will be seen that the bar 36 at the rear end of the transfer drag is in engagement with the dogs 24 at the rear end of the transfer box. When the parts have assumed this position, or at any time prior thereto, an operator should operate the rod 28 to swing the dog 27 out of engagement with the transverse bar 26, otherwise further rearward movement of the transfer drag will carry the charging box along with the transfer box. After the transfer box has been released from the charging box, the transfer box and transfer drag will be moved rearwardly together until the transfer box reaches the position thereof shown in Figure 13, whereupon the dogs 24 will engage suitable stops on the bridge 11 and be thrown out of engagement with the bar 36 at the rear end of the transfer drag. The continued movement of the cable will then pull the transfer drag out of the transfer box and permit the coal to be discharged into the chute 14, which directs it onto the conveyor 13.

When the coal has been thus discharged, the direction of the cable will be reversed and the transfer drag will be pulled back into position into the transfer box, whereupon the bar 39 at the forward end of the transfer drag will engage the dogs 25. Further movement of the cable in the same direction will pull the transfer box and transfer drag forwardly until the forward end of the transfer box abuts against the rear end of the charging box. Just before the forward end of the transfer box abuts against the rear end of the charging box, the free ends of the dogs 25 ride up over the transverse plate 30 at the rear end of the charging box and thus release the transfer drag. Therefore, when the forward end of the transfer box abuts against the rear end of the charging box, further movement of the cable will cause the transfer drag to be pulled into position in the charging box, as shown in Figure 8. This completes one cycle of operation of the coal handling apparatus shown in Figures 1 to 16, inclusive.

Referring to the modified construction shown in Figures 17, 18 and 19, 60 designates a loading station which is adapted to be shifted from time to time along the wall of the coal vein 61 as the cutting and breaking down of the coal proceeds. This charging station carries a pair of head sheaves 62 about which the operating cable 7ª extends. This operating cable extends up over inclined skids 63 and around tail sheaves 64 and guide sheaves 65 to drums 66. These drums and the motor for operating the same are adapted to be mounted upon a truck 67 running on rails 68 parallel to a conveyor 69. The operating cable is connected to a pair of transfer devices 70 and 71 so as to move one of the transfer devices from the loading station to a position to discharge its coal into a hopper 72 over the conveyor 69 while simultaneously moving the other transfer device from a position over the conveyor to the loading station.

Referring to Figure 19, each transfer device comprises a rectangular transfer box 73 which is open at its top and forward end. Sliding in the transfer box is the transfer drag 74 which is open at its top and bottom. The upper portions 75 of the sides of the transfer drag engage the side walls of the transfer box, while the lower portions 77 of the side walls of the transfer drag are spaced inwardly from the side walls 76 of the transfer box. Positioned in the spaces between the side walls 76 of the transfer box and the side walls 77 of the transfer drag are links 78 which are pivoted at their rear ends to the side walls 76. Each of these links is operatively connected to a pair of dogs 79 which are also pivoted to side walls 76 of the transfer box. The transfer drag has lugs 80 which are adapted to cooperate with the dogs 79.

In the position of the parts illustrated in Figure 17, the transfer device 70 is shown in position on the loading station 60, while the transfer device 71 is shown in position over the conveyor 69 to discharge its coal. In this position of the parts the transfer device 70 is adapted to be loaded either by hand or machinery through the open top of the transfer box. When the transfer device 70 has thus been loaded, the cable 7ª will be operated to pull the transfer device 70 into position over the conveyor and to pull the transfer device 71 into position on the loading station. As the forward end of the transfer device 70 reaches the bridge 81 extending over the chute 72, stops 82 will engage the pair of dogs 79 at the forward end of the transfer device and will throw all of the dogs out of engagement with the lugs 80, thereby permitting the transfer drag 74 to be pulled out of the transfer box 73 so as to enable it to discharge the coal into the chute 72. The direction of pull of the cable will then be reversed and the transfer drag will be pulled back into the transfer box, the lugs 80 on the transfer drag engaging the inclined ends of the dogs 79 and passing under the same. When the rear end of the transfer drag 74 engages the rear end of the transfer box, further pull of the cable rearwardly will pull the transfer device 70 back into position on the loading station.

In the system shown in Figure 20 there is a transfer means 83 which, like the transfer means in the system shown in Figure 1 comprises a charging box 84, a transfer drag 85 and a transfer box 86.

The charging box has deflectors 87 and 88 at its forward end projecting laterally with its sides. These deflectors, as the charging box is pulled forwardly into the coal pile 4ª, are adapted to deflect the coal into the charging box through its forward end and through the open sides of the box adjacent the deflectors. The charging box has a motor 89 mounted thereon adapted to operate a drum 90 about which an operating cable 7ᵇ is adapted to be wound. This cable passes about a guide sheave 91 carried by a side of the charging box and then extends forwardly beneath the undercut portion 92 of the coal vein 93 and has its end anchored at a suitable point. It will be apparent that by operating the drum to wind up the cable 7ᵇ, the transfer means 83 can be moved forwardly to fill the charging box with coal.

Secured to the sides of the charging box are beams 94 which extend upwardly and forwardly, the forward end portion of these beams being bent inwardly towards each other to form an A frame. A guide pulley 95 is journaled in the free end of this A frame and about this guide pulley passes the operating cable 96. One end of the cable 96 is attached to the front bar 97 of the transfer drag 85. The other end of the cable is attached to the bar 98 at the rear end of the transfer drag. The cable 96 passes around suitable winding drums which may be positioned adjacent any suitable conveyor system similar to the conveyor 13 shown in Figure 13.

The transfer drag 85 comprises the bars 97 and 98, having T-shaped heads 99 adapted to slide in guides 100 formed in a movable guide frame 101, guides 102 formed in a fixed part of the charging box, and guides 103 formed in the transfer box 86. The bars 97 and 98 carry the depending drags 104 which are adapted to be elevated and then dropped over the coal which has been deflected into the charging box.

The movable guide frame 101 forms part of the charging box 84. This guide frame has two pairs of posts 105 and 106 projecting upwardly therefrom which carry rollers 107 and 108 at their upper ends. These rollers are adapted to engage guides extending above the charging box and having horizontal portions 109 and inclined portions 110.

When the parts are in the relative positions shown in Figure 21, the charging box and transfer box are locked together by the dog 27ª. Also, before the transfer drag 85 reaches the position shown in Figure 25, the movable guide frame 101 is locked to the rear portion of the charging box by reason of the engagement of the locking dogs 111 with a rib 112 on said rear portion, the dogs 111 at that time occupying the dotted line position shown in Figure 25. Just before the front bar 97 of the transfer drag engages the front bar 113 of the movable guide frame, said bar 97 engages the end of a sliding rod 114, which extends through an opening in the bar 113. The rear end of the sliding rod 114 is operatively connected to the dogs 111 by a yoke 115. A spring 116 is connected to this yoke and tends to maintain the dogs 111 in the dotted line position shown in Figure 25. The engagement of the bar 97 with the end of the rod 114 causes the rod to be slid forwardly as the bar 97 comes into contact with the bar 113, thereby swinging the dogs 111 to the full line position shown in Figure 25 and unlocking the movable guide frame from the rear portion of the charging box.

Figure 23:
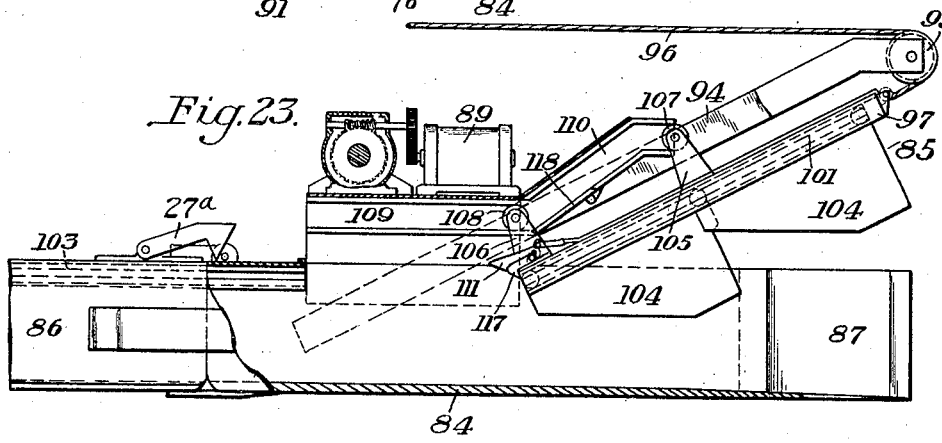
Figure 23 is a view corresponding to Figure 21, but showing certain of the parts in section.
Figure 22:
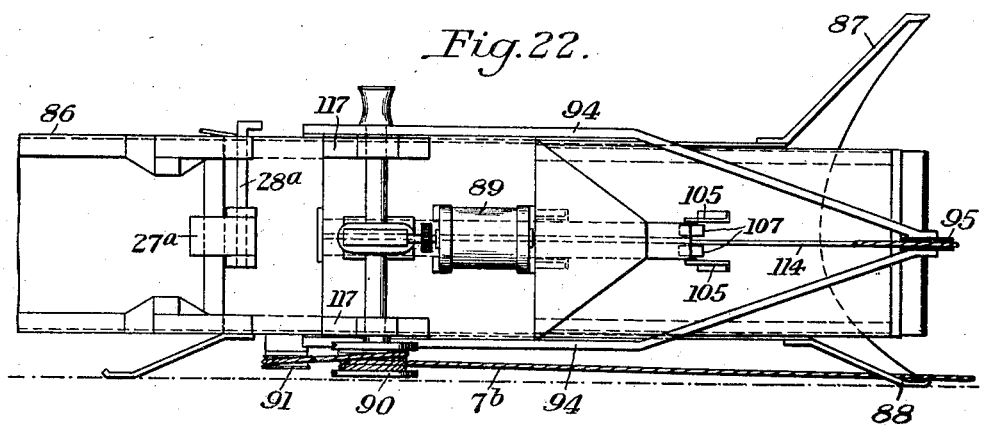

Further pull of the cable 96 in the same direction causes the transfer drag to assume the position shown in Figure 23, in which position the drags 104 are elevated over the coal in the charging box. Further pull on the operating cable 96 causes the rollers 107 to move out of the inclined guides 110, thereby permitting the drags 104 to drop down on the coal by slackening the cable 96. The direction of the cable is then reversed, which causes the movable guide frame 101 and the transfer drag to be moved rearwardly together by reason of the fact that the rear bar 98 of the transfer drag is engaged by dogs 117 at the rear end of the movable guide frame. Just before the rear end of the movable guide frame comes into abutting relation with the rear portion of the charging box, the dogs 117 ride up over the rib 112 and release the transfer drag from the movable guide frame. As the movable guide frame is pulled rearwardly, the rollers 108 move in the horizontal guides 109 and the rollers 107 are adapted to enter said guide by swinging the hinged portions 118 of the inclined guides 110 to the dotted line position shown in Figure 27.

After the movable guide frame 101 has been moved into contact with the rear portion of the charging box, further rearward pull of the cable 96 in the same direction moves the transfer drag through the guides 102 into the transfer box 86. The operating rod 28ª is then operated to swing the dog 27ª out of engagement with the transfer box 86, whereupon further pull of the cable 96 in the same direction pulls the transfer box with the transfer drag therein rearwardly to the unloading station, where the coal is adapted to be discharged in a manner similar to that disclosed in Figure 13. It will be understood that the transfer box 86 is similar in construction to the transfer box 19, shown in Figure 6.

The apparatus shown in Figures 20 to 29, inclusive, differs from that shown in Figures 1 to 16, inclusive, in that it is adapted for thick vein mining, in which there is enough head room to allow the transfer drag to be elevated and dropped over the coal in the charging box. Also, the entire transfer means is moved forwardly by the separate motor mounted on the charging box and operating a separate cable from that employed for moving the transfer drag and the transfer box.

It will be noted that in all of the constructions herein disclosed there is a transfer box which is adapted to carry a transfer drag from a loading station to an unloading station, where the transfer drag is pulled out of the transfer box to permit the coal to be discharged, and then is pulled back into the transfer box and the two moved together back to the loading station.

While I have shown and described a number of preferred embodiments of my invention, it will be understood that the invention is not limited to its illustrated embodiments or to the details of construction shown, but that it may be otherwise embodied within the scope of the appended claims without departing from the spirit of the invention.

I claim:

1. In a material handling apparatus, transfer means for moving material from a loading station to an unloading station, said means comprising a transfer box adapted to receive a charge of material, a transfer drag movable longitudinally of the box into and out of said box, and means for periodically simultaneously moving said drag and box between said stations and for periodically producing relative movement between said drag and box, substantially as described.

2. In a material handling apparatus, transfer means for moving material from a loading station to an unloading station, said means comprising a transfer box, a transfer drag movable relatively to said box for charging the same with material or for discharging material from the box, and means for producing simultaneous movement of the drag and box for effecting transfer of material by the box, or relative movement between the box and drag, substantially as described.

3. In a material handling apparatus, transfer means for moving material from a loading station to an unloading station, said means comprising a transfer box adapted to be moved into cooperative relation to the material to be transferred, a transfer drag adapted to move relatively to said box for charging the same with such material, or to discharge material therefrom, and means for producing either relative movement between the drag and box or simultaneous movement thereof, substantially as described.

4. In a material handling apparatus, transfer means for moving material from a loading station to an unloading station, said means comprising a box adapted to receive a charge of material, a transfer drag movable relatively to said box for delivering said charge thereto and for subsequently removing said charge therefrom, and operating means for producing relative movement between the drag and box for charging the box, simultaneous movement of the drag and box for transferring the charge, and relative movement between the drag and box for discharging the box, substantially as described.

5. Material handling apparatus, comprising a charging device, a transfer box adapted to be moved into cooperative relation thereto, a transfer device adapted to be periodically operated for transferring material from said charging device to said transfer box, and means for operating said transfer device to charge said box and for thereafter moving said box and transfer device to a discharge point, substantially as described.

6. Material handling apparatus, comprising a charging device adapted to be moved in cooperative relation with material to be transferred and to thereby receive a charge of said material, a transfer box adapted to be moved into cooperative relation to said charging device, a transfer device movable relatively to said charging device and transfer box for transferring the charge of material from the charging device to the transfer box, and means for effecting simultaneous movement of the transfer box and transfer device to an unloading station and for thereafter effecting relative movement between the transfer box and transfer device for discharging the material, substantially as described.

7. Material handling apparatus, comprising a charging device adapted to be moved into cooperative relation with material to be transferred and to thereby receive a charge of material, a transfer box movable into cooperative relation with the charging device, means for locking said transfer box to said charging device whereby said transfer box is movable with said charging device, a transfer device movable relative to said charging device and transfer box for transferring the charge of material from the charging device to the transfer box, and means for effecting simultaneous movement of the transfer box and transfer device to an unloading station and thereafter effecting relative movement between the transfer device and transfer box for discharging the material, substantially as described.

8. Material handling apparatus, comprising a charging box adapted to be moved in cooperative relation with material to be transferred and to thereby receive a charge of material, a transfer box movable into cooperative relation with the charging box, a transfer drag slidable in the charging box and transfer box for transferring the charge from the charging box to the transfer box, and means for effecting simultaneous movement of the transfer box and transfer drag to an unloading station and thereafter effecting relative movement between the transfer box and transfer drag for discharging the material, substantially as described.

9. Material handling apparatus, comprising a charging box movable in cooperative relation with the material to be transferred and to thereby receive a charge of material, said charging box having an opening therein and deflector means associated therewith for deflecting the material through said opening, a transfer box movable into cooperative relation with the charging box, a transfer drag slidable within the charging box and transfer box for transferring the charge from the charging box to the transfer box and slidable out of the transfer box for discharging the material, and means for effecting said movements of the transfer drag and for also effecting simultaneous movement of the transfer box and transfer drag for transferring the charge to an unloading station, substantially as described.

In testimony whereof I have hereunto set my hand.

ROBERT W. McCASLAND.